United States Patent [19]
Latimer et al.

[11] Patent Number: 6,023,030
[45] Date of Patent: Feb. 8, 2000

[54] BUS PLUG DOOR INTERLOCK

[75] Inventors: William R. Latimer, Belfontaine; Daryl R. Van Brocklin, Dublin; Jill M. Post, Tipp City, all of Ohio

[73] Assignee: Siemens Energy & Automation, Inc., Alpharetta, Ga.

[21] Appl. No.: 09/165,690

[22] Filed: Oct. 2, 1998

[51] Int. Cl.$^7$ ........................................................ H01H 9/22
[52] U.S. Cl. .................................................... 200/50.12
[58] Field of Search .......................... 200/50.01–50.03, 200/50.11–50.13, 50.16, 50.18; 361/601, 602, 605, 611, 615, 616, 622, 624, 628–632, 637, 640, 641, 647, 648, 724, 726

[56] References Cited

U.S. PATENT DOCUMENTS

| | | |
|---|---|---|
| 1,574,993 | 3/1926 | Miner . |
| 2,059,988 | 11/1936 | Frank ............................................ 247/3 |
| 2,888,529 | 5/1959 | Platz ............................................. 200/50 |
| 2,984,769 | 5/1961 | Turton ......................................... 317/120 |
| 3,018,320 | 1/1962 | Rowe ............................................ 174/99 |
| 3,052,769 | 9/1962 | Kuhar et al. .................................. 200/51 |
| 3,072,736 | 1/1963 | Wallace ........................................ 174/99 |
| 3,088,994 | 5/1963 | Cataldo ........................................ 174/99 |
| 3,113,820 | 12/1963 | Norden ......................................... 339/22 |
| 3,209,301 | 9/1965 | Duffy, Jr. ..................................... 339/22 |
| 3,299,232 | 1/1967 | Geppert ........................................ 200/50 |
| 3,299,233 | 1/1967 | Sciba ............................................ 200/50 |
| 3,345,455 | 10/1967 | Goody .......................................... 174/112 |
| 3,384,855 | 5/1968 | Jorgensen et al. ........................... 339/22 |
| 3,402,254 | 9/1968 | Parker et al. ................................ 174/133 |
| 3,566,331 | 2/1971 | Stanback et al. ............................. 339/22 |
| 3,657,606 | 4/1972 | Greger et al. ............................... 317/112 |
| 3,710,300 | 1/1973 | Koenig et al. ............................... 339/22 |
| 3,777,084 | 12/1973 | Rys .............................................. 200/50 A |
| 3,796,922 | 3/1974 | Mrenna et al. .............................. 317/112 |
| 3,818,417 | 6/1974 | Koenig et al. ............................... 339/22 |
| 3,852,515 | 12/1974 | Jorgensen et al. ........................... 174/68 |
| 4,146,285 | 3/1979 | Cook ............................................ 339/22 |
| 4,612,424 | 9/1986 | Clark et al. .................................. 200/50 A |
| 4,656,322 | 4/1987 | Paton et al. .................................. 200/50 A |
| 4,678,253 | 7/1987 | Hicks, Jr. et al. .......................... 439/210 |
| 4,835,350 | 5/1989 | Ozu et al. .................................... 200/50 A |
| 4,914,549 | 4/1990 | Leone et al. ................................. 361/336 |
| 5,442,135 | 8/1995 | Faulkner et al. ............................ 174/68.2 |
| 5,466,889 | 11/1995 | Faulkner et al. ............................ 174/68.2 |
| 5,486,651 | 1/1996 | Morgan ....................................... 174/68.2 |
| 5,619,014 | 4/1997 | Faulkner ..................................... 174/68.2 |
| 5,670,743 | 9/1997 | Welch et al. ................................. 174/49 |
| 5,760,339 | 6/1998 | Faulkner et al. ............................ 174/88 |

OTHER PUBLICATIONS

Square D Corporation, Busway Systems Catalog, Oct., 1992, Complete Catalog, particularly pp. 4–6, 9.

*Primary Examiner*—Michael Friedhofer

[57] ABSTRACT

An improved bus plug door interlock for use with a bus plug in conjunction with an electrical power busway distribution system is described. The bus plug includes the bus plug door interlock, a door, a housing and an electrical switch. The bus plug door interlock prevents the bus plug door from opening when the electrical switch is in the "on" position and prevents the power from being turned "on" when the door is open. The bus plug door interlock includes a door interlock pivot with a single flat surface and a elongated slot with a narrow and a wide section. When the door interlock pivot is in the narrow section of the elongated, the single flat surface engages narrow section of the elongated, preventing the electrical switch from being turned "on". When the door interlock pivot is in the wide section of the elongated slot, the door interlock pivot can rotate freely, allowing the electrical switch to be turned "on". Additionally, the single flat surface prevents the electrical switch from being turned "on" when the door is partially open.

11 Claims, 11 Drawing Sheets

BUS PLUG DOOR INTERLOCK

FIELD OF THE INVENTION

The present invention relates generally to improvements in bus plug units for tapping power from electrical busway distribution systems. More specifically, the present invention relates to a bus plug unit with a bus plug door interlock which prevents the bus plug door from opening when the bus plug switch is in the "power on" position and prevents the power from being turned on when the door is open.

BACKGROUND OF THE INVENTION

Electrical power distribution busway systems are typically used to distribute electrical power throughout buildings, particularly commercial or industrial type buildings. Generally, the busway includes a number of busway sections which are connected to one another by busway joints. Each busway section includes a housing that encloses a plurality of busbars which may be phase busbars, neutral busbars, or ground busbars depending on the particular application. High current (high-amp) busway systems generally have current carrying capacity of 600 to 5000 amperes, while low current (low-amp) generally have current carrying capacity of 200 to 800 amperes.

The machines, lights, tools and other components requiring electricity are provided access to the power conducting busbars at various power tap-off locations disposed along the busway. An opening is typically provided through the housing at each power tap-off location and the conductive material of the busbars is exposed for connection with a bus plug connector. The bus plug generally includes an electrical housing containing one or more breakers and a disconnect switch. A mechanical connector is provided for mechanically attaching the bus plug to the busway. An electrical connector extends from the bus plug through a window in the busway housing. A door on the bus plug housing provides access to the interior of the housing.

Electrical standards require an interlock mechanism to prevent the bus plug door from being opened when the disconnect switch is in the "power on" position and to prevent the power from being turned on when the door is open. Typically, prior art designs could be defeated by partially opening the bus plug door, forcing the power on and then fully opening the bus plug door.

Accordingly, it would be advantageous to provide a bus plug door interlock mechanism that may not be defeated by forcing the power on while the bus plug door is partially opened.

SUMMARY OF THE INVENTION

The present invention provides for a bus plug with a bus plug door interlock which prevents the bus plug door from opening when the bus plug switch is in the "power on" position and prevents the power from being turned on when the door is open. Additionally, the present invention advantageously utilizes an asymmetric "single flat" antirotation feature which prevents the disconnect switch from being forced to a "power on" position when the door is partially closed.

A more complete understanding of the present invention, as well as further features and advantages, will be apparent from the following Detailed Description and the accompanying drawings.

2

DETAILED DESCRIPTION

The present invention provides for a bus plug with a bus plug door interlock which prevents the bus plug door from opening when the bus plug switch is in the on position and prevents the power from being turned on when the door is open. Additionally, the present invention utilizes an asymmetric "single flat" antirotation feature which prevents the disconnect switch from being forced to the power on position when the door is partially closed. The present invention now will be described more fully with reference to the accompanying drawings, in which several presently preferred embodiments of the invention are shown. This invention may, however, be embodied in various forms and should not be construed as limited to the embodiments set forth herein. Rather, applicants provide these embodiments so that this disclosure will be thorough and complete, and will fully convey the scope of the invention to those skilled in the art.

Figure 1:
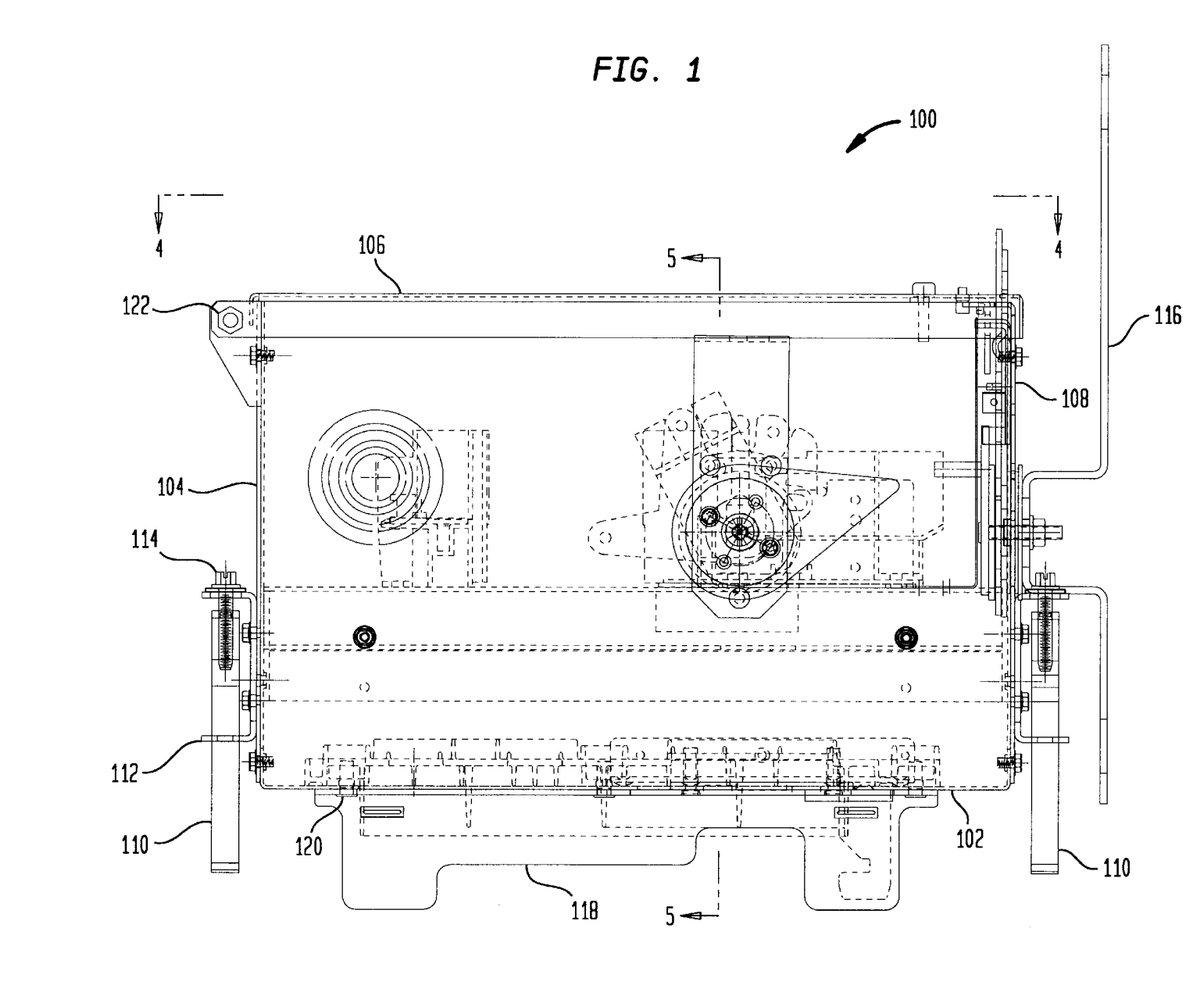
FIG. 1 is a plan view from the top of a bus plug in accordance with the present invention.
Figure 2:
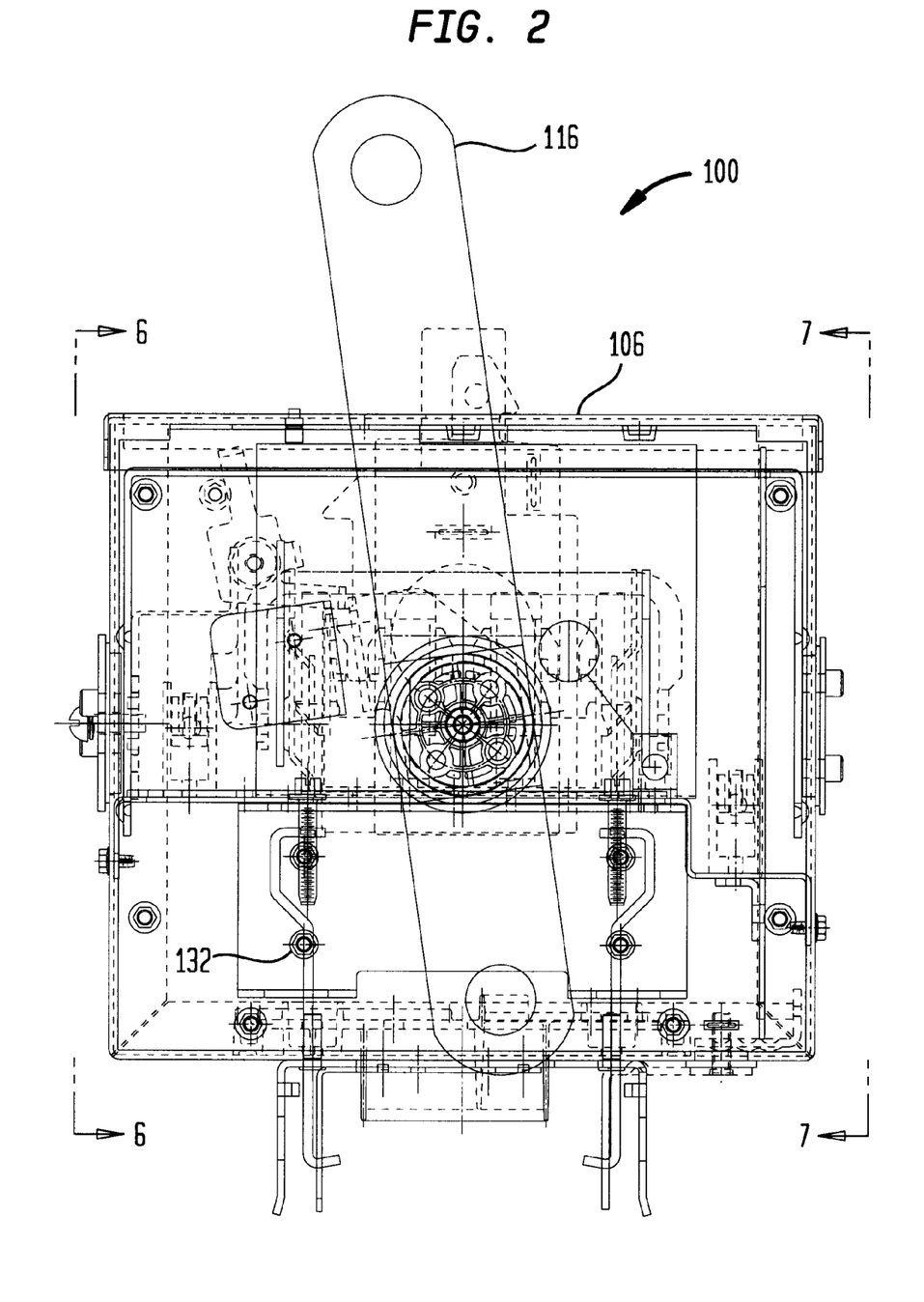
FIG. 2 is a side elevation of a bus plug in accordance with the present invention.
Figure 3:
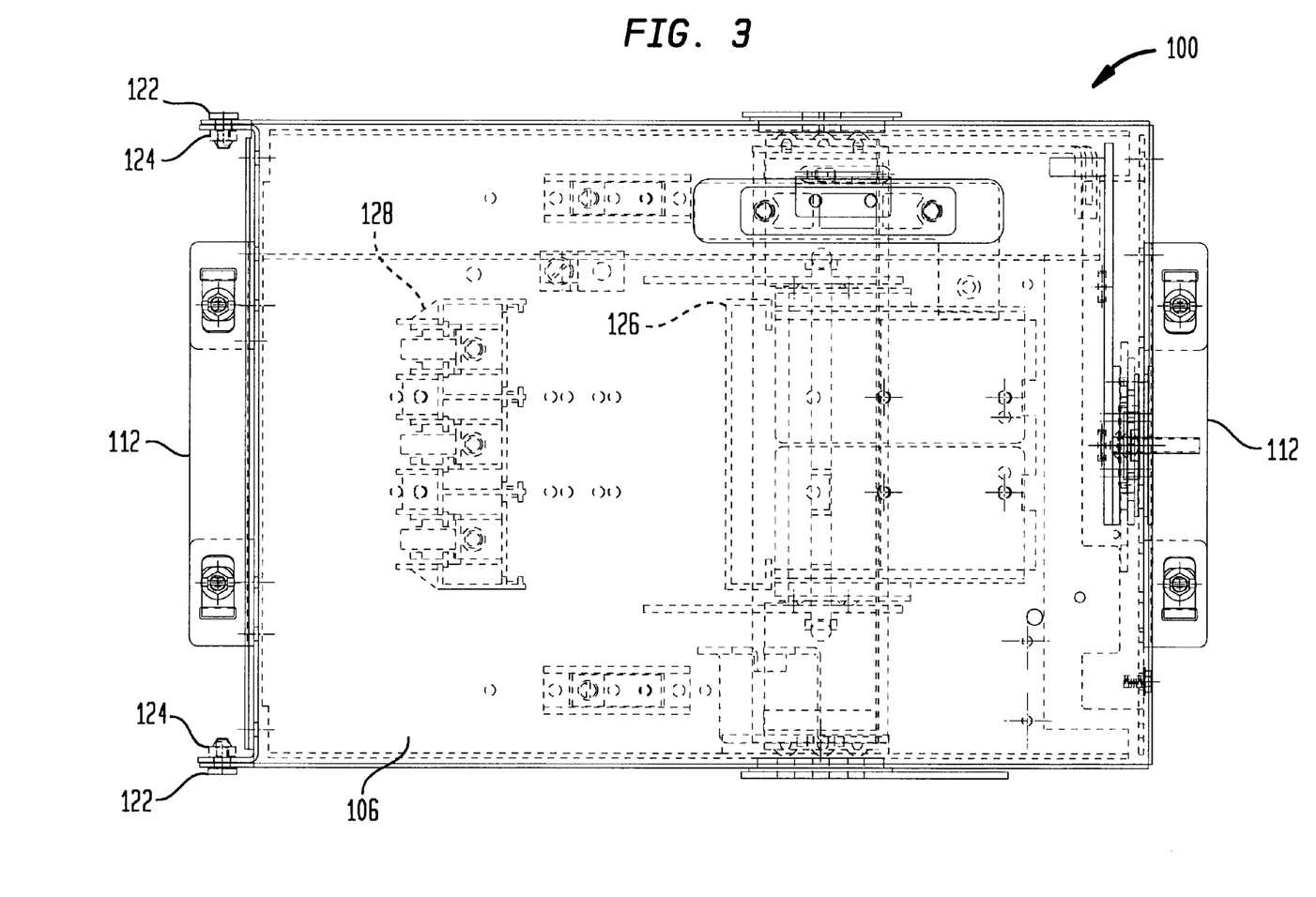
FIG. 3 is a front elevation of a bus plug in accordance with the present invention.

Referring to FIGS. 1–3, in the preferred embodiment, a bus plug 100 is comprised of a generally rectangular bus plug box 102 constructed of sheet metal, a hinge end panel 104, a bus plug door 106 pivotally mounted on the hinge end panel 104 and a line end assembly 108. As best shown in FIGS. 1 and 3, the bus plug door 106 pivots on a pair of screws 122 which are locked into place by a pair of nuts 124. As seen in FIG. 1, a first pair of mounting hooks 110 is connected to hinge end panel 104 by a mounting bracket 112 and a plurality of screws 114. A second pair of mounting hooks 110 is connected to the line end assembly 108 by a second mounting bracket 112 and a plurality of screws 114. A disconnect handle 116 connects to line end assembly 108. A support rail assembly 118 (shown in FIGS. 5 and 6) is connected to the bus plug box 102 by a plurality of hex nuts 120 on the external side of bus plug box 102 opposite the door 106.

Figure 4:
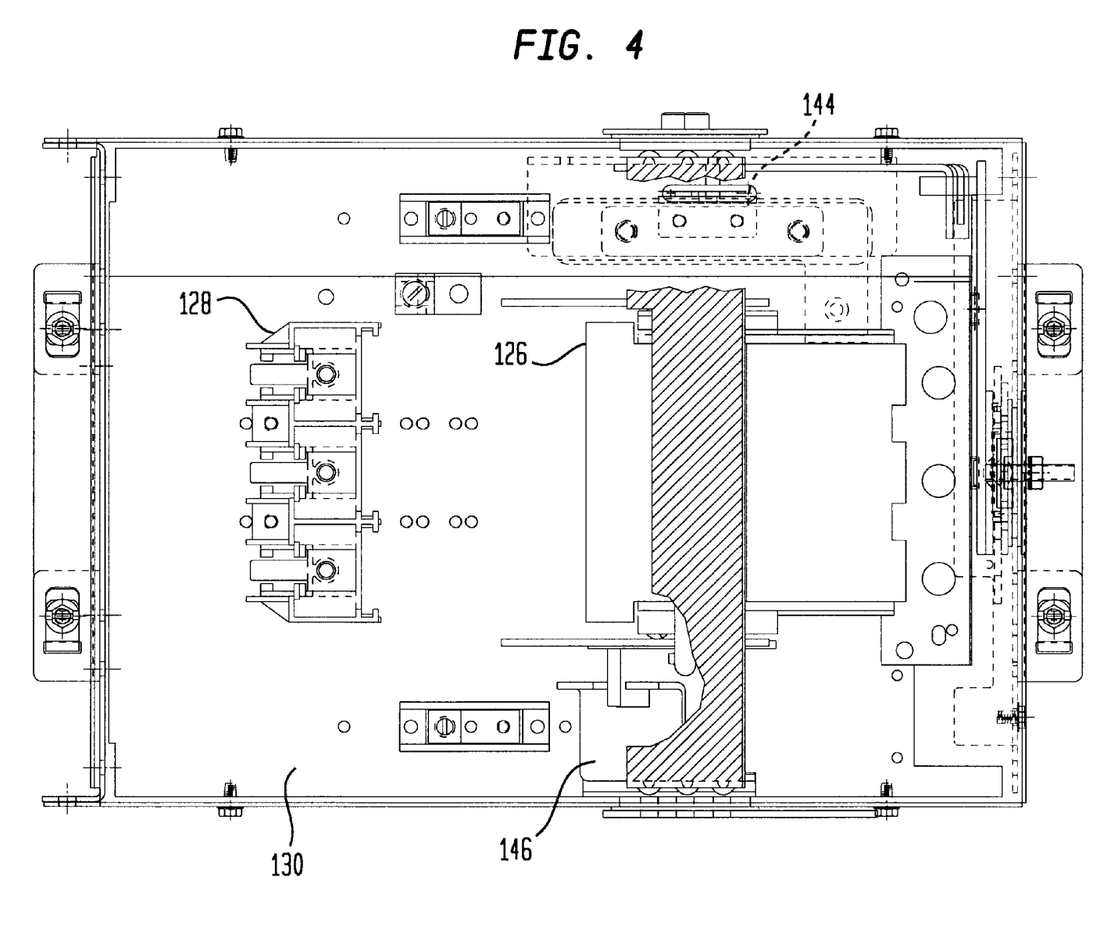
FIG. 4 is a view on the line 4—4 of FIG. 1, with the bus door not shown.
Figure 5:
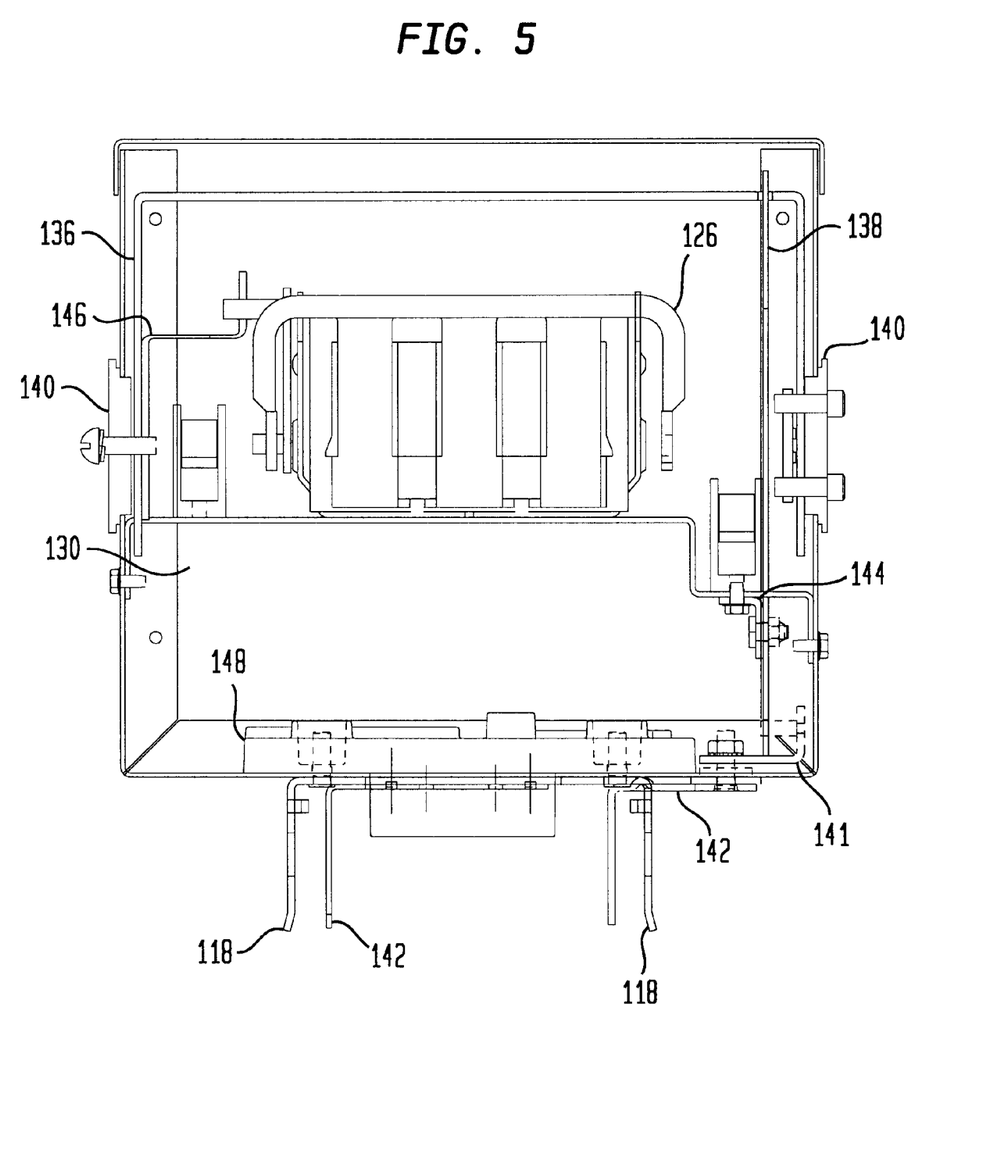
FIG. 5 is a section on the line 5—5 of FIG. 1.
Figure 6:
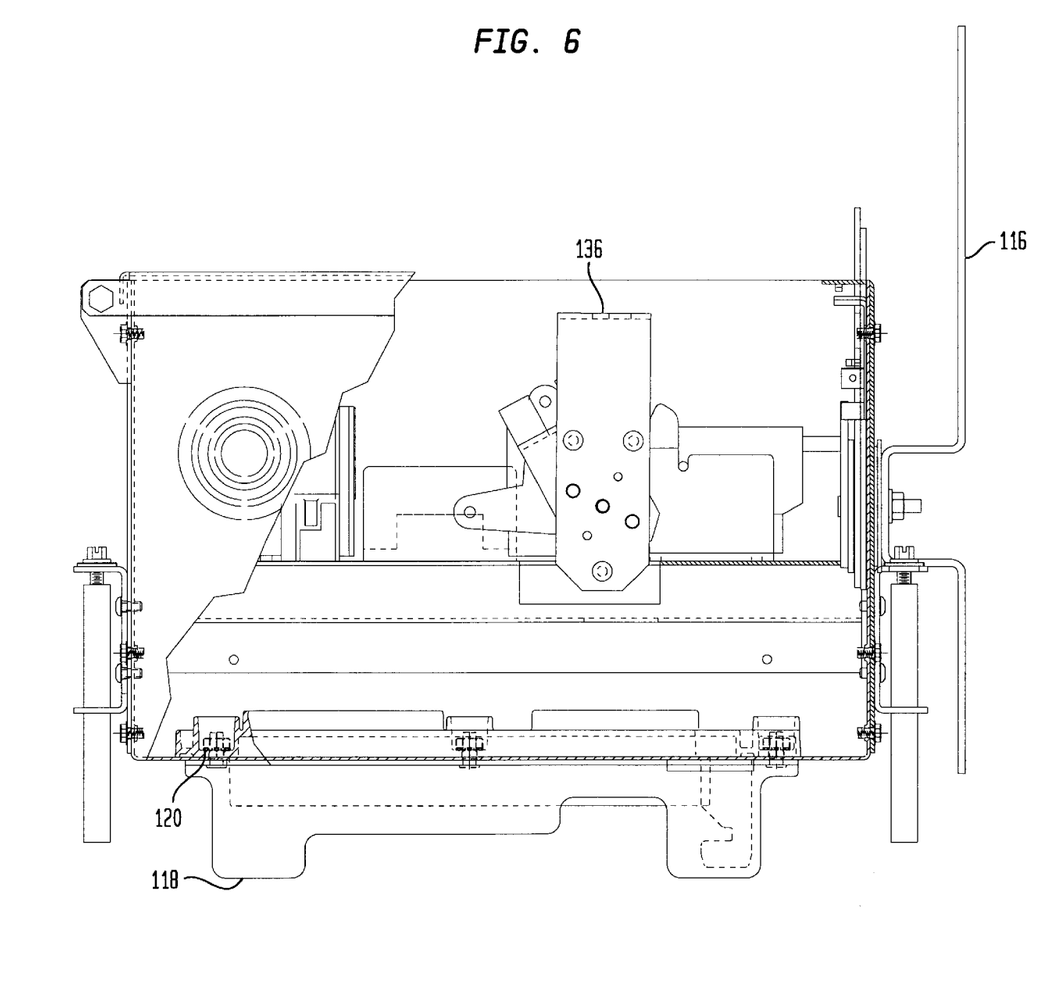
FIG. 6 is a partial cut away view on the line 6—6 of FIG. 2.

To provide an electrical switching mechanism, as best seen in FIGS. 4 and 5, a switch line base assembly 126 and a switch load base assembly 128 are disposed within bus plug box 102 on a pan 130. A plurality of fuses (not shown) electrically connects the switch line base assembly 126 to the switch load base assembly 128. The pan 130 is connected to the bus plug box 102 by a plurality of screws 132.

Figure 7:
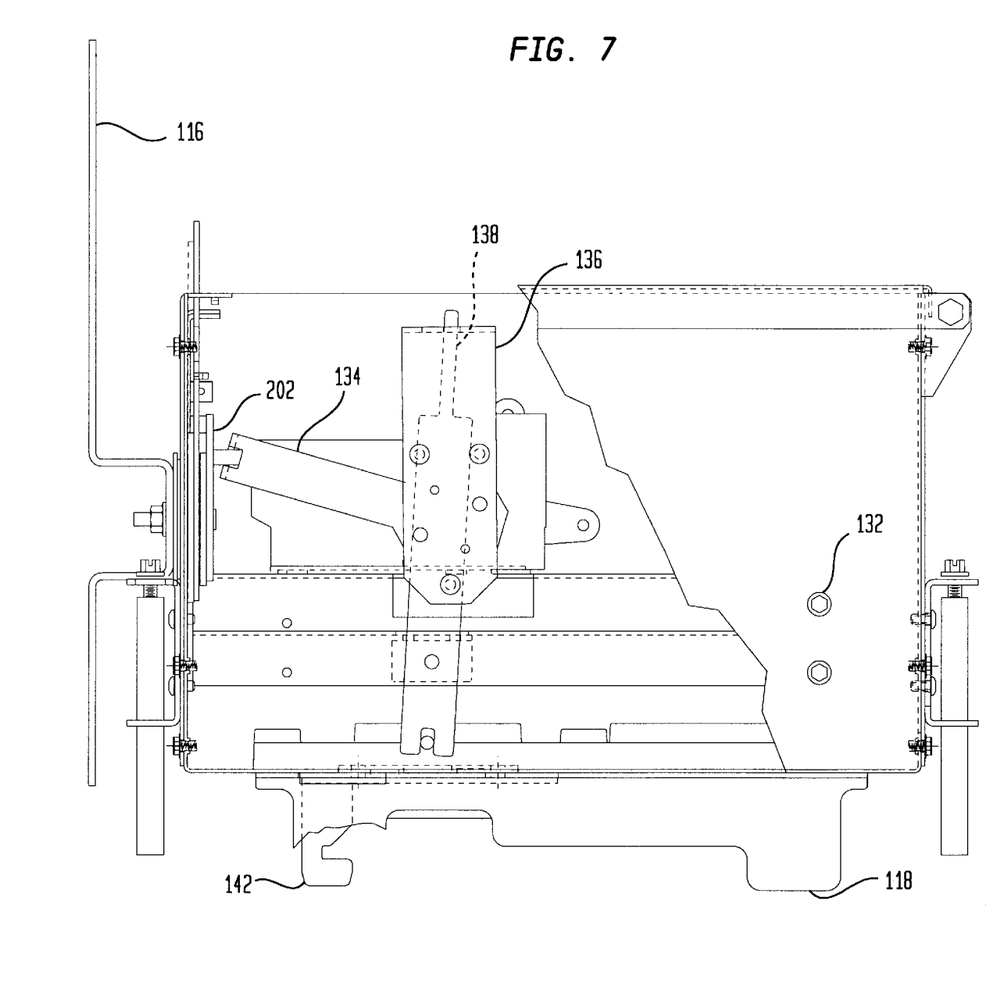
FIG. 7 is a partial cut away view on the line 7—7 of FIG. 2.

A translator fork 134 is provided to translate motion from the rotation of the handle 116 to a switch bail operator 136. Thus, as shown in FIG. 7, the translator fork 134 connects to a translator arm 202 (described below) and to the switch bail operator 136. As shown in FIG. 5, the switch bail operator 136 is pivotally mounted on two pivots 140. An interlock operator 138 connects to the switch bail operator 136 and to an interlock driver assembly 141.

To provide a mechanical connection to the bus plug, an interlock stab assembly 142, as shown in FIG. 5, is mounted on the external side of bus plug box 102 opposite the door 106 and is mechanically connected to the interlock driver assembly 141. The interlock operator 138 is pivotally mounted on an interlock pivot 144 which is connected to the pan 130. An operator 146 is connected to the switch operator bail 136 and to the switch line base assembly 126. A cabled finger base assembly 148 is mounted on the internal side of bus plug box 102 opposite the door 106 and electrically connected to the switch line base assembly 126. A plurality of fingers (not shown) are mounted on the external side of bus plug box 102 opposite the door 106. The fingers engage the busbars of an electrical power distribution busway and provide a conductive path for the flow of current.

When the handle 116 is moved from the off position to the on position, the translator arm 202 moves the translator fork 134, forcing the switch bail operator 136 to pivotally rotate. The rotation of the switch bail operator 136 causes the operator 146 to engage the switch line base assembly 126, forcing it to the on position and allowing electrical current to flow from the busway through the cabled base finger assembly 148, the switch line base assembly 126, the fuses and to the switch line base assembly 126. Additionally, the rotation of the switch bail operator 136 forces the interlock operator 138 to rotate about the interlock pivot 144, which causes the interlock driver assembly 141 to slide the interlock stab assembly 142 to engage the busway housing, locking the bus plug 100 into place. The support rail assembly 118 provides a generally U-shaped channel to enclose the busway housing.

The handle 116 may alternatively be mounted directly on the pivot 140. In this configuration, the movement of the handle 116 from the off position to the on position directly causes the switch bail operator 136 to pivotally rotate. In a preferred embodiment, the handle 116 may be remounted between the line end assembly 108 and the pivot 140 to accommodate different mounting positions of the bus plug.

Figure 8:
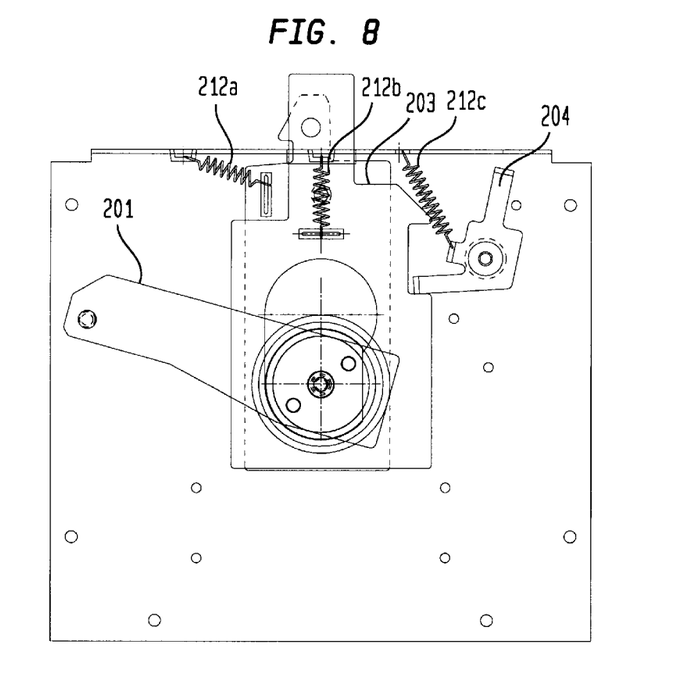
FIG. 8 is a view from the interior of a bus plug of a line end wall assembly in accordance with the present invention.
Figure 9:
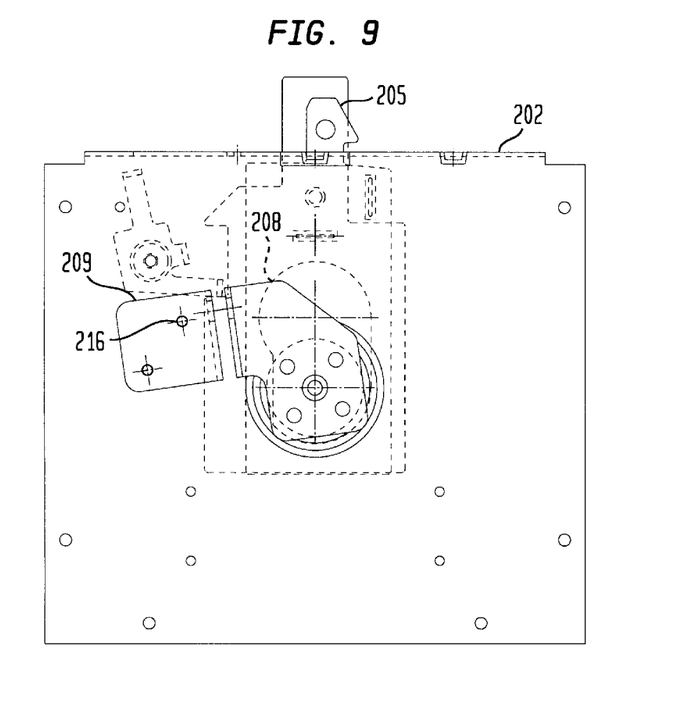
FIG. 9 is a view from the exterior of a bus plug of the line end wall assembly of FIG. 8 in accordance with the present invention.
Figure 10:
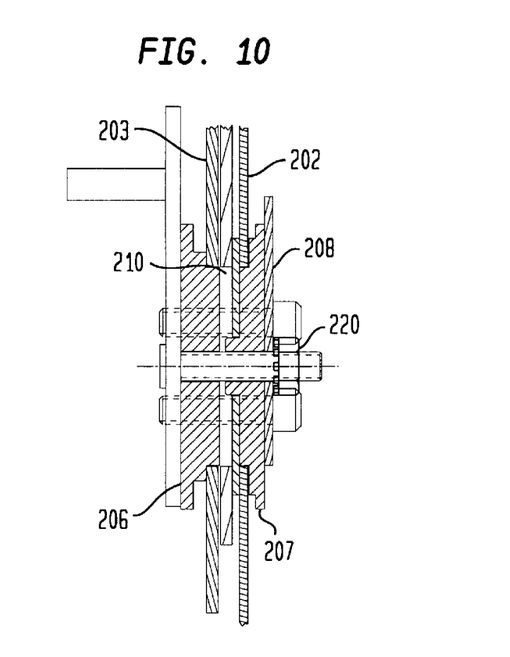
FIG. 10 is section on the line 10—10 of FIG. 9.

FIGS. 8 and 9 show a detailed view of the line end assembly 108. FIG. 10 is sectional view on the line 10—10 of FIG. 9 in accordance with the present invention. A generally circular door interlock pivot 206, which includes a flat 232 (FIG.11), is pivotally mounted for rotation in the line end wall 202 (FIG. 10). A door interlock spacer 210 is mounted externally of the line end wall panel 202 for pivoting with the door interlock pivot 206 using a pan head screw 220. A line end wall cover 207, disposed adjacent to the door interlock spacer 210, is also mounted for pivoting with the door interlock pivot 206.

A lockout bracket 209 is connected externally to a line end wall panel 202 by a pair of rivets 216 to provide an anchor for mechanically locking the line end assembly 108 during maintenance or other work. A lockout adapter bracket 208, disposed adjacent to the line end wall cover 207, is mounted for pivoting with the door interlock pivot 206. Both the lockout adapter bracket 209 and lockout bracket 208 include a hole (not shown) that allows use of a lock inserted through the holes to prevent the disconnect handle 116 from being moved from the off position to the on position. The disconnect handle 116 may be mounted adjacent to the lockout adapter bracket 208 for pivoting with the door interlock pivot 206.

A door latch plate 205 is pivotally mounted on the door interlock pivot 206. A spring 212a connects the line end wall panel 202 and the door latch plate 205.

Figure 11:
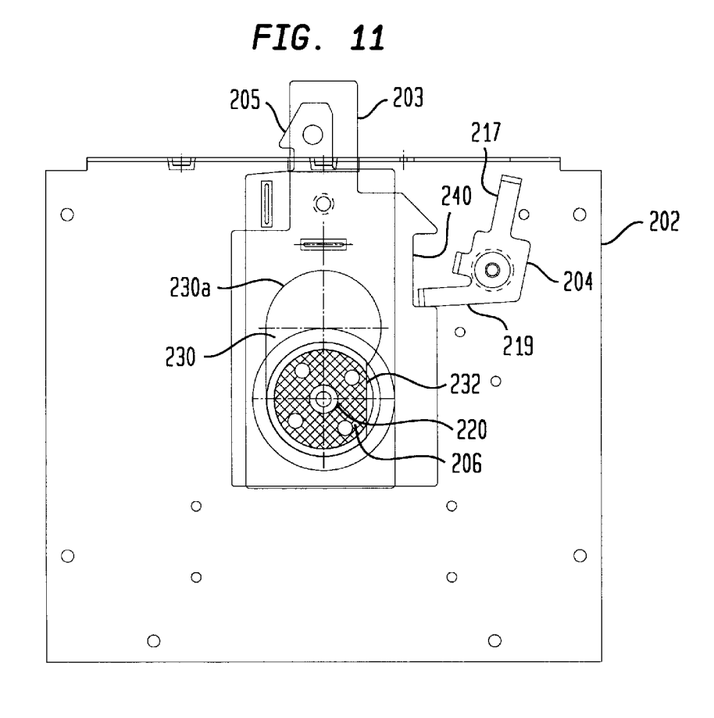
FIG. 11 is a view of the line end wall assembly with the door interlock plate in the extended position in accordance with the present invention.
Figure 12:
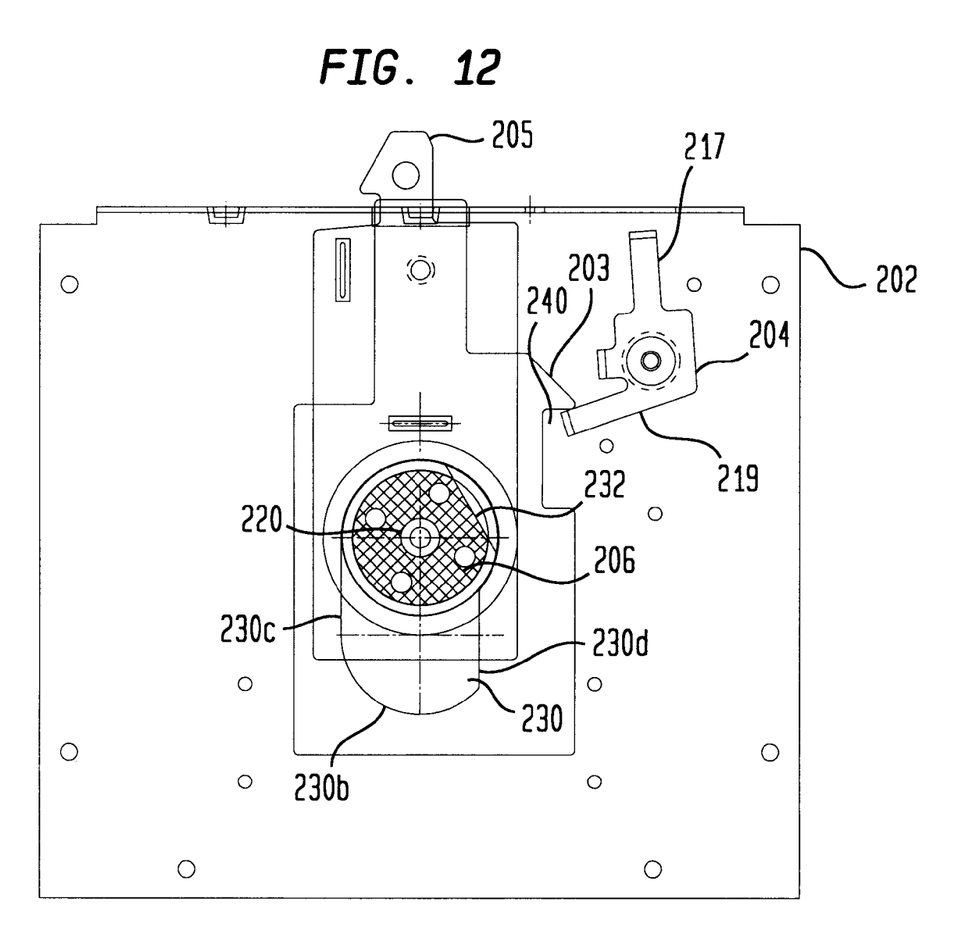
FIG. 12 is a view of the line end wall assembly with the door interlock plate in the retracted position in accordance with the present invention.

As best seen in FIGS. 11 and 12, a door interlock plate 203 includes an elongated hole 230 composed of a narrow section and a wide section. The wide section of elongated hole 230 is formed from a partial circular wall 230a, having generally the same radius as the door interlock pivot 206. The narrow section of elongated hole 230 includes a partial circular wall 230b and two parallel walls 230c, 230d. The parallel walls 230c, 230d are separated by a distance generally equal to the width of the door interlock pivot 206 measured perpendicular to the flat 232. The wall 230c is tangent to the partial circular wall 230a and the partial circular wall 230b. The wall 230d intersects the partial circular wall 230a and the partial circular wall 230b as a chord of circles defined by those walls.

The door interlock plate 203 is connected to the line end wall panel 202 by a spring 212b (FIG. 8). The door interlock pivot 206 (FIG. 11) is captured within the elongated hole 230 of the door interlock plate 203.

An interlock bracket 204 (FIGS. 11 and 12) is pivotally mounted internally of line end wall 202. The interlock bracket includes a pair of shaped tabs 217, 219. The shaped tab 219 is disposed within a notch 240 disposed on the door interlock plate 203. A spring 212c (FIG. 8) connects interlock bracket 204 to the line end wall 202. A translator arm 201 (FIG. 8), is mounted adjacent to and for rotation with the door interlock pivot 206. A pair of screws 217 pass through the disconnect handle 116, the lockout adapter bracket 208, the line end wall cover 207, the door interlock spacer 210, the door interlock pivot 206 and the translator arm 202, forcing these elements to move in unison.

Figure 14:
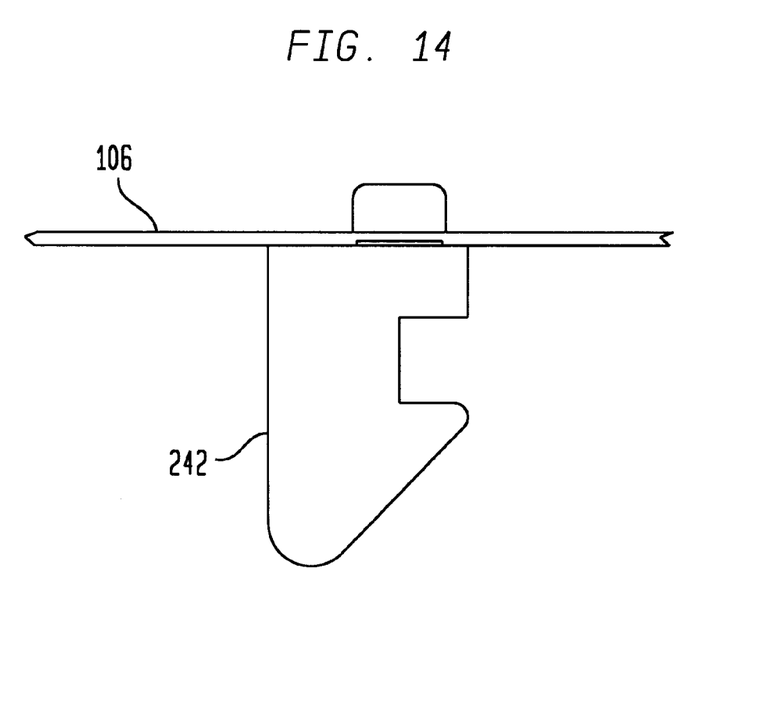
FIG. 14 is a view of a door hook in accordance with the present invention.

FIGS. 11 and 12 show the line end wall assembly 108 with the door interlock plate 203 in the extended position and retracted position, respectively. The door interlock plate 203 slides along the door interlock pivot 206 between an extended position and a retracted position as shown in FIGS. 11 and 12. When the bus plug door 106, shown in FIG. 1, is open, the door interlock plate 203 is biased in the extended position by the spring 212b (FIG. 8) so that the door interlock plate 203 protrudes beyond the edge of line end panel 202 as shown in FIG. 11. When the bus plug door 106 is closed, the door interlock plate 203 is forced into the retracted position (FIG. 12), with the door interlock plate 203 extending only approximately 0.075 inches beyond the edge of line end panel 202. As the door interlock plate 203 moves to the retracted position, the door latch plate 205 is engaged by the bus plug door 106 and cammed to rotate against the force of spring 212a. The door latch plate 205 snaps back to lock the door 106 closed. Additionally, when the door interlock plate 203 moves to the retracted position, the slot 240 forces the interlock bracket 204 to rotate, causing the tab 217 to engage a hook 242 (shown in FIG. 14) disposed on bus plug door 106 and hold the bus plug door 106 in the closed position.

Figure 13:
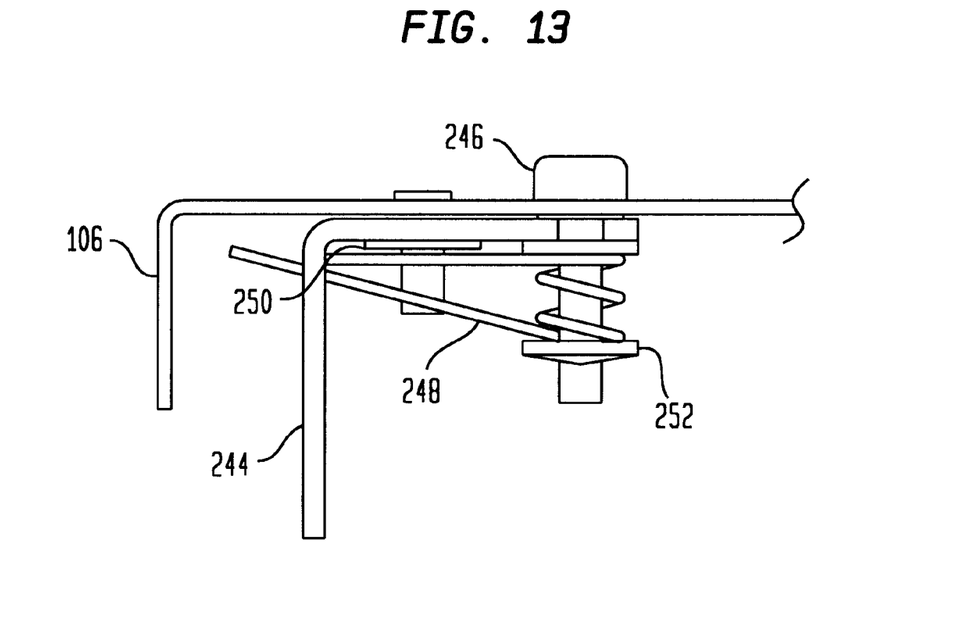
FIG. 13 is a partial cross-sectional view of a bus plug door in accordance with the present invention.

To open the bus plug door 106, the tab 217 must be disengaged from the hook 242. As shown in FIG. 13, an L-shaped member 244 is pivotally mounted on the interior of the bus plug door 106 by a bolt 246. A tension member 248 is disposed on the bolt 246 and engages the L-shaped member 244 and a rivet 250. A washer 252 disposed on the bolt 246 and maintains the tension member 248 in place. When bolt 246 is rotated, the L-shaped member 244 rotates and engages the tab 217 of the interlock bracket 204, causing the interlock bracket 204 to rotate to the off position and the tab 217 to disengage the hook 242. The bus plug door 106 may then be opened by disengaging the door latch plate 205 from the bus plug door 106.

The door interlock plate 203 engages the door interlock bracket 404 and moves the door interlock bracket 204 into the on position shown in FIG. 12 when the bus plug door 106 is shut and the interlock plate 203 is in the retracted position. When the door interlock bracket 204 is in the on position, the door 106 may be not be opened except as described above by disengaging the tab 217 from the hook 242.

When the door interlock plate 203 is in the retracted position, as when the door 106 is closed, the door interlock pivot 206 can rotate within the wide portion of the elongated slot 230 in the door interlock plate 203 and power can be turned on. When the door 106 is opened, however, the door interlock plate 203 slides to the extended position under the force of the spring 212b. In this position, the narrow portion of the elongated slot 230 captures the door interlock pivot 206 along the flat 232, preventing door interlock pivot 206 from rotating. Thus, switch line base assembly 126 is prevented from being turned on when the bus plug door 106 is open. The flat 232 also advantageously prevents the switch line base assembly 126 from being forced into the on position when the door 105 is partially closed. The single flat 232 of the present invention is positioned to "walk" away from the enlarged portion of the slot 230 when the door interlock pivot 206 is rotated toward the "on" position, which is counterclockwise in FIG. 11. This prevents the switch line base assembly 126 from being forced to the on position, even with the door 106 partially closed and the interlock plate 203 partially retracted.

We claim:

1. A bus plug for connecting to an electrical distribution busway, the bus plug including:

a housing;

a door attached to the housing, the door having an open position and a closed position;

an electrical switch disposed within the housing, the electrical switch having an off position and an on position;

an interlock pivot disposed in a hole on a wall of the housing and including a single flat surface;

a handle externally disposed on the interlock pivot such that the handle and the interlock pivot rotate in unison between an off position and an on position, the interlock pivot operatively connected to the electrical switch such that when the handle is in the off position the switch is in the off position and when the handle is in the on position the switch is in the on position;

a door interlock plate including a slot with a narrow section and a wide section, the interlock pivot disposed within the slot, the door interlock plate capable of moving around the pivot which is within the slot between an extended position corresponding to the interlock pivot disposed within the narrow section of the slot and a retracted position corresponding to the interlock pivot disposed within the wide section of the slot;

a first spring connected between the housing and the door interlock plate biasing the door interlock plate in the extended position;

wherein when the door is in the open position, the door interlock plate is in the extended position and the flat of the interlock pivot cooperates with the narrow section of the slot to maintain the handle in the off position; and wherein when the door is in the closed position, the door interlock plate is in the retracted position and the handle can rotate between the off and on positions.

2. The bus plug of claim 1 including a door latch plate internally disposed on the door interlock pivot;

a second spring connected between the housing and the door latch plate biasing the door latch plate in a first position;

wherein when the door moves from the open position to the closed position, the door latch plate moves to a second position; and wherein when the door is in the closed position, the door latch plate confines the door to the closed position.

3. The bus plug of claim 2 including:

an interlock bracket pivotally disposed on the wall of the housing, the interlock bracket having an open position and a closed position, the interlock bracket including a first and a second tab, the first tab disposed within a notch on the door interlock plate such that when the door interlock plate is in the closed position the interlock bracket is in the closed position;

a third spring connected between the housing and the interlock bracket biasing the interlock bracket in the open position when the door interlock plate is in the open position; and wherein when the door is in the closed position, the interlock bracket is in the closed position and the second tab maintains the door in the closed position.

4. The bus plug of claim 3 further including:

a hook disposed on a interior surface of the door; and wherein when the door is in the closed position, the second tab of the interlock bracket engages the hook and maintains the door in the closed position.

5. The bus plug of claim 4 further including:

a L-shaped member pivotally disposed on the interior surface of the door, the L-shaped member having an engaged position and a disengaged position, wherein when the door is in the closed position, the L-shaped member can be pivotally rotated to the engaged position to engage the second tab and force the interlock bracket to the open position.

6. The bus plug of claim 1 further comprising a translator arm, the interlock pivot operatively connected to the electrical switch by the translator arm internally disposed on the interlock pivot such that the handle, the translator arm and the interlock pivot rotate in unison between the off position and the on position, the translator arm mechanically connected to the electrical switch such that when the translator arm is in the off position the switch is in the off position and when the translator arm is in the on position the switch is in the on position.

7. The bus plug of claim 1 where:

the door interlock pivot is of a first predetermined radius and is of a first predetermined width measured perpendicular to the flat surface;

the wide section of the slot is defined by a first partially circular wall of a second predetermined radius, the second predetermined radius generally equal to the first predetermined radius; and the narrow section of the slot is defined by a second partially circular wall of a third predetermined radius and a first and a second wall separated by a first separation distance, the first wall tangentially intersecting the first partially circular wall and the second partially circular wall, the second wall intersecting the first partially circular wall and the second partially circular wall and disposed in a parallel orientation to the first wall, the third predetermined radius generally equal to the first predetermined radius, the first separation distance generally equal to the first predetermined width.

8. A door interlock mechanism for mounting on a wall and for locking a door, the wall having a first and a second side, the door having an open and a closed position, the door interlock mechanism comprising:

an interlock pivot disposed in a hole on a wall of the housing and including a single flat surface, the pivot having a first and a second side corresponding to the first and second sides of the wall;

a handle disposed on the first side of the interlock pivot and a translator arm disposed on the second side of the interlock pivot such that the handle, the translator arm and the interlock pivot rotate in unison between an off position and an on position;

a door interlock plate including a slot with a narrow section and a wide section, the interlock pivot disposed within the slot, the door interlock plate capable of moving about the pivot which is within the slot between an extended position wherein the interlock pivot is disposed within the narrow section of the slot and a retracted position wherein the interlock pivot is disposed within the wide section of the slot;

wherein when the door is in the open position and the door interlock plate is in the open position, the flat of the interlock pivot cooperates with the narrow section of the slot to maintain the handle in the off position; and wherein when the door is in the closed position and the door interlock plate is in the closed position, the handle can rotate between the on and off positions.

9. The door interlock mechanism of claim 8 including:

a door latch plate internally disposed on the interlock pivot, the door latch plate operatively biased in a first position;

wherein when the door moves from the open position to the closed position, the door latch plate moves to a second position; and wherein when the door is in the closed position, the door latch plate confines the door to the closed position.

10. The door interlock mechanism of claim 8 including:

an interlock bracket pivotally disposed on the wall, the interlock bracket having an open position and a closed position, the interlock bracket including a first and a second tab, the first tab disposed within a notch on the door interlock plate such that when the door interlock plate is in the closed position the interlock bracket is in the closed position, the interlock bracket operatively biased to the open position; and wherein when the door is in the closed position, the interlock bracket is in the closed position and the second member maintains the door in the closed position.

11. The door interlock mechanism of claim 8 where:

the door interlock pivot is of a first predetermined radius and is of a first predetermined width measured perpendicular to the flat surface;

the wide section of the slot is defined by a first partially circular wall of a second predetermined radius, the second predetermined radius generally equal to the first predetermined radius; and the narrow section of the slot is defined by a second partially circular wall of a third predetermined radius and a first and a second wall separated by a first separation distance, the first wall tangentially intersecting the first partially circular wall and the second partially circular wall, the second wall intersecting the first partially circular wall and the second partially circular wall and disposed in a parallel orientation to the first wall, the third predetermined radius generally equal to the first predetermined radius, the first separation distance generally equal to the first predetermined width.

* * * * *